United States Patent
Dakin et al.

(10) Patent No.: US 8,950,481 B2
(45) Date of Patent: Feb. 10, 2015

(54) METHODS OF CLEANING WELLBORES AND ANALYZING WELLBORE FLUIDS

(75) Inventors: Eugene Dakin, Katy, TX (US); Hui Zhang, Sugar Land, TX (US); Bethicia B. Prasek, The Woodlands, TX (US)

(73) Assignee: M-I LLC, Houston, TX (US)

( * ) Notice: Subject to any disclaimer, the term of this patent is extended or adjusted under 35 U.S.C. 154(b) by 546 days.

(21) Appl. No.: 12/745,149

(22) PCT Filed: Nov. 21, 2008

(86) PCT No.: PCT/US2008/084367
§ 371 (c)(1),
(2), (4) Date: May 27, 2010

(87) PCT Pub. No.: WO2009/073412
PCT Pub. Date: Jun. 11, 2009

(65) Prior Publication Data
US 2010/0307746 A1   Dec. 9, 2010

Related U.S. Application Data

(60) Provisional application No. 60/991,352, filed on Nov. 30, 2007.

(51) Int. Cl.
*E21B 43/22* (2006.01)
*C09K 8/524* (2006.01)

(52) U.S. Cl.
CPC .................................... *C09K 8/524* (2013.01)
USPC ............. 166/250.1; 166/250.02; 166/250.03; 166/250.05; 166/270.1; 166/270; 166/311

(58) Field of Classification Search
USPC .............. 166/250.01, 250.02, 250.03, 250.2, 166/250.3, 270, 270.01, 311; 507/240, 211, 507/244, 246, 261, 266, 203
See application file for complete search history.

(56) References Cited

U.S. PATENT DOCUMENTS

| | | | | |
|---|---|---|---|---|
| 4,234,421 A | * | 11/1980 | Dover, Jr. ................... | 210/728 |
| 4,976,874 A | * | 12/1990 | Gannon et al. ............. | 210/755 |
| 5,306,909 A | * | 4/1994 | Jones et al. ................ | 250/255 |
| 5,310,002 A | | 5/1994 | Blauch et al. | |
| 5,519,214 A | | 5/1996 | Houwen et al. | |
| 5,580,379 A | * | 12/1996 | Cowan ....................... | 106/789 |
| 5,634,984 A | * | 6/1997 | Van Slyke .................. | 134/40 |
| 5,977,032 A | * | 11/1999 | Chan .......................... | 507/211 |
| 6,035,936 A | | 3/2000 | Whalen | |
| 6,914,036 B2 | | 7/2005 | Spalding | |
| 6,972,274 B1 | | 12/2005 | Slikta et al. | |
| 2003/0008781 A1 | * | 1/2003 | Gupta et al. ................ | 507/240 |
| 2006/0019836 A1 | * | 1/2006 | Li et al. ...................... | 507/240 |

FOREIGN PATENT DOCUMENTS

| | | |
|---|---|---|
| EP | 507405 A2 | 10/1992 |
| EP | 566394 A1 | 10/1993 |
| EP | 1091085 A1 | 4/2001 |
| WO | 0123703 A1 | 4/2001 |
| WO | 0127438 A1 | 4/2001 |

OTHER PUBLICATIONS

Search Report issued in corresponding European Application No. 08857170.8 dated Sep. 13, 2011 (9 pages).
Examiner's Report issued with Canadian Patent Application No. 2707259 dated Feb. 28, 2012, 4 pages.
International Search Report from PCT/US2008/084367 dated Jun. 29, 2009 (3 pages).
Written Opinion from PCT/US2008/084367 dated Jun. 29, 2009 (5 pages).
Examiner's Report dated Nov. 28, 2012 in corresponding Canadian application No. 2,707,259 (3 pages).
Communication Pursuant to Article 94(3) EPC issued Dec. 19, 2012 in corresponding European application No. 08 857 170.8 (5 pages).
Office Action issued Oct. 9, 2013 in corresponding Canadian application No. 2,707,259 (3 pages).

* cited by examiner

*Primary Examiner* — Zakiya W Bates
*Assistant Examiner* — Silvana Runyan
(74) *Attorney, Agent, or Firm* — Osha Liang LLP

(57) ABSTRACT

A method of analyzing a wellbore fluid that includes treating a wellbore fluid with an emulsifying fluid, the emulsifying fluid comprising: a hydroxylated ether; an amphoteric chemotrope; and testing the treated wellbore fluid for at least one of turbidity and total suspended solids is disclosed. Methods of cleaning wellbores are also disclosed.

17 Claims, No Drawings

METHODS OF CLEANING WELLBORES AND ANALYZING WELLBORE FLUIDS

BACKGROUND OF INVENTION

1. Field of the Invention

Embodiments disclosed herein relate generally to methods of cleaning wellbore. In particular, embodiments disclosed herein relate generally to methods of analyzing wellbore fluids used in cleaning wellbores.

2. Background Art

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

One way of protecting the formation is by forming a filter cake on the surface of the subterranean formation. Filter cakes are formed when particles suspended in a wellbore fluid coat and plug the pores in the subterranean formation such that the filter cake prevents or reduce both the loss of fluids into the formation and the influx of fluids present in the formation. A number of ways of forming filter cakes are known in the art, including the use of bridging particles, cuttings created by the drilling process, polymeric additives, and precipitates. Upon completion of drilling, the filter cake may stabilize the wellbore during subsequent completion operations such as placement of a gravel pack in the wellbore.

After any completion operations have been accomplished, removal of filter cake (formed during drilling and/or completion) remaining on the sidewalls of the wellbore may be necessary. Although filter cake formation and use of fluid loss pills are essential to drilling and completion operations, the barriers can be a significant impediment to the production of hydrocarbon or other fluids from the well if, for example, the rock formation is still plugged by the barrier. Because filter cake is compact, it often adheres strongly to the formation and may not be readily or completely flushed out of the formation by fluid action alone.

The problems of efficient well clean-up, stimulation, and completion are a significant issue in all wells, and especially in open-hole horizontal well completions. The productivity of a well is somewhat dependent on effectively and efficiently removing the filter cake while minimizing the potential of water blocking, plugging, or otherwise damaging the natural flow channels of the formation, as well as those of the completion assembly. Further, additional economic efficiency may be realized if operators are able to determine when the well is clean.

Accordingly, there exists a continuing need for developments in wellbore cleaning operations.

SUMMARY OF INVENTION

In one aspect, embodiments disclosed herein relate to a method of analyzing a wellbore fluid that includes treating a wellbore fluid with an emulsifying fluid, the emulsifying fluid comprising: a hydroxylated ether; an amphoteric chemotrope; and testing the treated wellbore fluid for at least one of turbidity and total suspended solids.

In another aspect, embodiments disclosed herein relate to a method of cleaning a wellbore that includes collecting a wellbore fluid circulated through the wellbore; treating the collected wellbore fluid with an emulsifying fluid, the emulsifying fluid comprising: a hydroxylated ether; and an amphoteric chemotrope; and testing the treated wellbore fluid for at least one of turbidity and total suspended solids.

Other aspects and advantages of the invention will be apparent from the following description and the appended claims.

DETAILED DESCRIPTION

In one aspect, embodiments disclosed herein relate to methods of cleaning wellbore. In particular, embodiments disclosed herein relate generally to methods of analyzing wellbore fluids used in cleaning wellbores.

When attempting to clean a wellbore, such as to remove a filtercake, or equipment within the wellbore, such as tubulars or other equipment, a wellbore fluid is circulated through the wellbore and monitored to determine when the wellbore and/or equipment has been sufficiently cleaned. In particular, the returned wellbore fluids are typically subjected to tests such as those to determine turbidity and total suspended solids, and circulation of the fluid (cleaning) is continued until the test result values meet a specified threshold value indicating that the wellbore is cleaned. Such wellbore fluids frequently are comprised of a brine as a base fluid, a cleaning fluid such as a solvent-surfactant package designed for cleaning and displacement of oil/synthetic based drilling fluids, and/or a lubricant as a friction reducing agent.

Frequently, the wellbore fluid may experience increased opaqueness and higher total suspended solids values than what is expected, despite continued circulation of the fluids. While increased turbidity may be the result of higher suspended solids (indicating that a wellbore has not yet been sufficiently cleaned), the inventors of the present application have determined that higher turbidity and total suspended solids test values may instead be reflective of an interference between the fluid and the tests, in particular reflective of a partial emulsion within the wellbore fluid.

Thus, in accordance with an embodiment of the present disclosure, collected wellbore fluids may be treated with an emulsifying fluid so that the wellbore fluid may be completely emulsified prior to testing of the fluids. By forming a complete emulsion, the interference associated with the partial emulsion may be removed, and the tests may more accurately reflect the properties of the returned fluid, which may in turn more accurately reflect whether a wellbore and/or equipment has been sufficiently cleaned.

Emulsifying fluids may be comprised of several components including an emulsifying agent, an amphoteric chemotrope, and optionally, a mutual solvent. The combination of the first two components may allow for stabilization of an emulsion of an oleaginous fluid into a brine.

The term "oil-in-water emulsion" refers to emulsions wherein the continuous phase is an aqueous phase and the discontinuous phase is oil, which is dispersed within the continuous phase. When combining the two immiscible fluids (aqueous and oleaginous) without the use of a stabilizing emulsifier, while it is possible to initially disperse or emulsify one fluid within the other, after a period of time, the discontinuous, dispersed fluid droplets coalesce or flocculate, for example, due to the instability of the formed emulsion. Thus, to stabilize the emulsion, an emulsifier may be used. Whether an emulsion turns into a water-in-oil emulsion or an oil-in-water emulsion depends on the volume fraction of both phases and on the type of emulsifier.

Generally, the Bancroft rule applies to the behavior of emulsions: emulsifiers and emulsifying particles tend to promote dispersion of the phase in which they do not dissolve very well; for example, a compound that dissolves better in water than in oil tends to form oil-in-water emulsions (that is they promote the dispersion of oil droplets throughout a continuous phase of water). Emulsifiers are typically amphiphilic. That is, they possess both a hydrophilic portion and a hydrophobic portion. The chemistry and strength of the hydrophilic polar group compared with those of the lipophilic nonpolar group determine whether the emulsion forms as an oil-in-water or water-in-oil emulsion. In particular, emulsifiers may be evaluated based on their HLB value. The term "HLB" (Hydrophilic Lipophilic Balance) refers to the ratio of the hydrophilicity of the polar groups of the surface-active molecules to the hydrophobicity of the lipophilic part of the same molecules. Generally, to form an oil-in-water emulsion, an emulsifier (or a mixture of emulsifiers) having a high HLB, such as greater than 11, may be desirable. In a particular embodiment, the HLB value of the emulsifier may range from 11 to 16.

In the presence of an aqueous fluid with a high salt content, such as seawater, conventional emulsifying agents, including hydroxylated ethers, esters, alkyl sulfonates, alkyl aryl sulfonates, alkyl phosphates, carboxylated-ethoxylated tallow amines, betaine compounds, ethoxylated fatty acids, ethoxylated amines, ethoxylated phenols, polyoxyethylene fatty acids, esters, ethers, and mixtures thereof, which will not stabilize an oleaginous fluid into an aqueous fluid contains salts therein. However, the use of such emulsifier with an amphoteric chemotrope may allow for such stabilization. Such emulsifier blends using amphoteric chemotrope are discussed in U.S. Patent Application No. 60/99,346, entitled "Emulsifier Blend," which is assigned to the present assignee and herein incorporated by reference in its entirety.

Emulsifiers may include for example hydroxylated ethers, such as those produced by the addition reaction between alkanols or alkyl phenols with alkyl oxides. However, one skilled in the art would appreciate that any emulsifying agent may be used such as those described above, including non-ionic, cationic or anionic emulsifying agents, as long as a hydrophilic/lipophilic balance sufficient to obtain a stable emulsion of oil into water. Selection among the emulsifying agents may be dependent, for example, on the particular oleaginous fluid to be emulsified (as to the HLB value required to emulsify the fluid), the presence of pH-dependent solutes. Thus, for example, a non-ionic or basic emulsifier may be particularly desirable when solubilization of acid-soluble solids within fluid is undesirable.

In a particular embodiment, the emulsifying fluid may include at least one of an alkanol ethoxylate and an alkyl phenol alkoxylate. Exemplary alkanol ethoxylated include those based on hydrocarbon chain lengths of 8-18 carbon atoms. A common measure of degree of ethoxylation is the Hydrophile-Lipophile Balance (HLB) number. The HLB number is defined as the weight percentage of ethylene oxide in the molecule divided by 5. In a particular embodiment, the HLB value of the emulsifier may range from 11 to 16 to allow for emulsification of oil in water. Exemplary alkyl phenol ethoxylates may include those with the chemical formula $RC_6H_4(OC_2H_4)_nOH$, where R contain 8-12 carbon atoms and may be branched or unbranched. The desired degree of ethoxylation in either alkanol ethoxylates or alkyl phenol ethoxylates, n, may range from 2 to 15, and may range from 4 to 8 in other embodiments. However, one skilled in the art would appreciate that additional ethoxylation may be possible as well. Further, one skilled in the art would appreciate that selection between an alkanol ethoxylate and alkyl phenol ethoxylate may partly be based on environmental considerations. Further, selection of a particular emulsifier may be made based on the acidity of the emulsifier. That is, one skilled in the art would appreciate that to accurately determine evaluate a wellbore fluid for total suspended solids (and whether a wellbore is sufficiently cleaned), a non-acidic emulsifier may be preferable to prevent solubilization of any solids suspended in the fluid being tested. Commercial examples of hydroxylated ethers suitable for use in the present disclosure include IGEPAL® CO-630, a nonyl phenol ethoxylate, and BIO-SOFT® N1-7 and N91-6, alcohol ethoxylates, all of which are available from Stephan Company (Northfield, Ill.).

As stated above, in the presence of an aqueous fluid with a high salt content, such as seawater, conventional emulsifying agents will not stabilize an oleaginous fluid into an aqueous fluid that contains salts therein. The instability of the oil-in-brine emulsion may be explained by examining the principles of colloid chemistry. The stability of a colloidal dispersion (emulsion for a liquid-liquid dispersion) is determined by the behavior of the surface of the particle via its surface charge and short-range attractive van der Waals forces. Electrostatic repulsion prevents dispersed particles from combining into their most thermodynamically stable state of aggregration into the macroscopic form, thus rendering the dispersions metastable. Emulsions are metastable systems for which phase separation of the oil and water phases represents to the most stable thermodynamic state due to the addition of a surfactant to reduce the interfacial energy between oil and water.

Oil-in-water emulsions are typically stabilized by both electrostatic stabilization (electric double layer between the two phases) and steric stabilization (van der Waals repulsive forces), whereas invert emulsions (water-in-oil) are typically stabilized by only steric stabilization. The addition of salts, however, may result in a reduced electrical double layer. As the double layer decreases, and the distance between two oil droplets is reduced, the oil droplets have more chances to collide with each other and coalesce. Thus, the increase of salt concentration in an emulsion system will increase the electrical conductivity and will in turn destabilize emulsions. Other ways in which salts may potentially destabilize an emulsion include reversible flocculation, irreversible flocculation, change in proton concentrations, etc. Thus, when salts are added to an oil-in-water emulsion stabilized by a conventional emulsifier, the salts, aqueous fluid, and oleaginous fluid are separated into three distinct phases.

However, the use of an emulsifier having a high HLB in conjunction with an amphoteric chemotrope may allow for stabilization of the emulsion by formation/stabilization of the double layer(s). As used herein, an amphoteric chemotrope refers to a compound that exhibits dual properties of being amphoteric (a substance that can react as either an acid or a base) and chemotropic (the way in which a substance orients itself in relation to other chemicals). In a particular embodiment, the amphoteric chemotrope may be hydrotropic (the way in which a substance orients itself in relation to water). Use of this class of compounds may allow for the stabilization of an oil-in-brine emulsion that is not otherwise stabilized by a conventional emulsifier. Thus, the amphoteric chemotrope may also be referred to as a co-emulsifier or a brine compatibility agent as a result of its ability to transform an otherwise unstable mixture into a stabilized emulsion.

In a particular embodiment, the amphoteric chemotrope may be a quaternary ammonium compound represented by the formulae below:

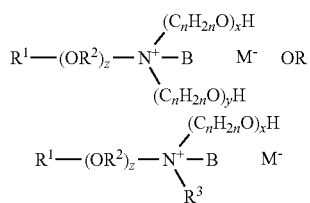

where R1 may be an alkyl or alkenyl group having at least 8 carbons; R2 may be an alkyl group having 2-6 carbon atoms; R3 may be an alkyl group having at least 4 carbons; n may be either 2 or 3; x+y is greater than 5, preferably 5-20; z ranges from 0 to 3; B is hydrogen, an oxyalkyl or alkyl having 1 to 4 carbons, and M is a counter anion, such as a halide. However, one skilled in the art would appreciate that that there may be a balance between the R1/R2 chain and the sum of x+y. That is, if the R1/R2 chain possesses more than 22 carbons, it may be desirable to increase the amount of alkoxylation to greater than 20 so that the compound remains amphiphilic, and vice versa. In particular embodiments, the R1 may be derived from various fatty acids such as butanoic acid (C4), hexanoic acid (C6), octanoic acid (C8), decanoic acid (C10), dodecanoic acid (C12), tetradecanoic acid (C14), hexadecanoic acid (C16), octadecanoic acid (C18), etc.

Further, the counter anions to the quaternaries of the present disclosure may include a variety of counter anions such as the conjugate base to any mineral or strong organic acid, such as halide ion, nitrate ion, sulfate ion, acetate ion, alkyl sulfonate ion, haloalkylsulfonate ions, and the like. Additionally, one skilled in the art would appreciate that additional variations such as substitutions, etc., may exist, so long as they do not alter the nature of the compound to stabilize oil in brine (or to stabilize other chemicals (primary emulsifiers) which stabilize oil in brine).

Examples of suitable amphoteric chemotropes may include quaternary ammonium salts, including quaternary ammonium halides such as chlorides. In a particular embodiment, the amphoteric chemotrope may be an alkoxylated quaternary ammonium chloride (ethoxylated or propoxylated) including quaternary ammonium chlorides derived from fatty amines. Examples of such alkoxylated quaternary ammonium chloride may be isotridecyloxypropyl poly(5) oxyethylene methyl ammonium chloride or coco poly(15) oxyethylene methyl ammonium chloride. Commercial examples of suitable amphoteric chemotrope include Q-17-5 and Q-C-15, which are both ethoxylated quaternary ammonium chlorides, available from Air Products and Chemicals (Allentown, Pa.).

The emulsifying fluid may also optionally contain a mutual solvent, which may aid in blending the emulsifying and brine compatibility agents into a wellbore fluid. One skilled in the art would appreciate that by incorporating the agents into the mutual solvent, greater ease in blending the agents in a wellbore fluid may be achieved. However, use of such solvents is optional, and the agents may be incorporated into a wellbore fluid without such solvent.

One example of a suitable mutual solvent may be a glycol ether or glycerol. In a particular embodiment, the mutual solvent is ethylene glycol monobutyl ether (EGMBE). The use of the term "mutual solvent" includes its ordinary meaning as recognized by those skilled in the art, as having solubility in both aqueous and oleaginous fluids. In some embodiments, the solvent may be substantially completely soluble in each phase while in select other embodiment, a lesser degree of solubilization may be acceptable. Further, in a particular embodiment, selection of a mutual solvent may depend on factors such as the type and amount of salt present in the fluid. For example, in a salt-saturated fluid calcium bromide may have greater compatibility with ethylene glycol monobutyl ether while calcium chloride may have greater compatibility with glycerol. One skilled in the art would appreciate that this difference in compatibility may result from the electronegativity difference between various salts, and the relative ability of the solvent to distribute charges.

The formulation of the fluid may be comprised of (by volume) 40-70 percent of the amphoteric chemotrope, 10-40 percent of the emulsifying agent; and 0-40 percent of the mutual solvent. In other embodiments, however, a lower concentration of amphoteric chemotrope and emulsifying agent may be sufficient to form an oil-in-brine emulsion so long as a greater amount of amphoteric chemotrope is used as compared to the emulsifying agent. In a particular embodiment, a ratio of 2:1 to 10:1 of amphoteric chemotrope:emulsifier may be desirable. However, one skilled in the art would appreciate that the amount of amphoteric chemotrope necessary depends on the how incompatible the emulsifier is with brine. For example, if the emulsifier is somewhat incompatible with brine, a ratio of 2:1 to 4:1 of amphoteric chemotrope:emulsifier may be sufficient, while a less compatible emulsifier may require a ratio of 3:1 to 10:1 amphoteric chemotrope:emulsifier. Further, depending on the ratios required, it may also be desirable to use a diluent to make the fluid more economical.

The aqueous fluid which forms the continuous phase of the formed oil-in-water emulsions may include at least one of sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, sulfur, aluminum, magnesium, potassium, strontium, silicon, lithium, and phosphorus salts of chlorides, bromides, carbonates, iodides, chlorates, bromates, formates, nitrates, oxides, and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The oleaginous fluid that may form the discontinuous phase of the formed oil-in-water emulsion may be a liquid, more preferably a natural or synthetic oil, and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids; similar compounds known to one of skill in the art; and mixtures thereof. However, no limitation on the type of oleaginous fluids which may be emulsified is intended by the above list. Rather, the above list includes various oleaginous fluids frequently used in wellbore operations. One of ordinary skill in the art would appreciate that other types of oleaginous fluids may be emulsified in accordance with the present disclosure.

Following addition of an emulsifying fluid to a wellbore fluid, at least one of turbidity and total suspended solids analysis may be performed on the emulsified fluid. Threshold values may depend on the desires of the particular operator; however, either of a fluid's turbidity and/or total suspended solids may reduced, as compared to an untreated wellbore fluid. Use of such emulsifying fluids may result in testing values having R-squared values of greater than 0.900 in some embodiments, greater than 0.970 in other embodiments, greater than 0.990 in yet other embodiments, and at least 0.995 in yet other embodiments.

EXAMPLE

The following example was performed to demonstrate the effectiveness of treating a wellbore fluid to emulsify the fluid and reduce any interference with turbidity and/or total suspended solids.

Example 1

A sample fluid containing the components shown in Table 1 below Synthetic Sea Water (965 mL); an internal olefin C16-18 base oil (20 ml); was blended to simulate a hazy-opaque fluid collected from a wellbore cleaning operation. A comparative fluid consisting of synthetic sea water was used for comparison against the sample fluid. SAFE-LUBE® is a phosphate-based lubricant for brines and ONE PASS™ is water wetting agent, both of which are available from M-I LLC (Houston, Tex.).

TABLE 1

Ingredients to Create Synthetic Opaque Solution

| Ingredient | Amount |
|---|---|
| Synthetic Sea Water | 965 ml |
| Base Oil (IO-1618) | 20 ml |
| SAFE-LUBE ® | 10 ml |
| ONE PASS ™ | 5 ml |

The cause of the opacity was determined by adding 1) an acid (50 vol % HCl-15%), which typically dissolves many salts into their water-soluble form and 2) an emulsifier into two volumes of the sample wellbore fluid. The emulsifier added included an ethoxylated ammonium quaternary halide (10% vol/vol), alkylphenol ethoxylate (30% vol/vol), and a mutual solvent (60% vol/vol). The first sample did not change in appearance, while the second sample turned to a slightly yellow, clear fluid, indicating that the opacity of the fluid was not due to the presence of solids and was instead due to oil contamination. Emulsification of the second sample was verified by microscopy.

Testing was performed to determine a value of Total Suspended Solids in this synthetic contaminated sea water sample. The following samples were numerated as shown below in Table 2.

TABLE 2

Product Names of TSS and Flow Rate Samples.

| Ref. | Name |
|---|---|
| 1 | Synthetically Contaminated Sea Water |
| 2 | 100 ml Synthetically Contaminated Sea Water and 60 ml Emulsifier |
| 3 | 100 ml Tap water and 60 ml Emulsifier |
| 4 | Tap Water |
| 5 | Emulsifier |
| 6 | Clarified Synthetic Sea Water |
| 7 | 100 ml Clarified Synthetic Sea Water and 60 ml Emulsifier (1AD) |
| 8 | IO-1618 Base Oil (20072537) |

To determine the amount of filterable solids and these samples flow rates, the following initial test procedure was developed, as detailed in Table 3 below.

TABLE 3

Procedure for Filterable Solids and Sample Flow Rates Procedure

1) Warm 0.45 micron filter papers to 135° F. for a minimum of one hour.
2) Measure the weight of each filter paper to the nearest 10,000$^{ths}$ of a gram. Record the weight results.
3) Accurately measure 100 ml of sample in a graduated cylinder and measure its temperature.
4) Place 60 ml of distilled water through the filter paper at 10 psi vacuum to test for consistent vacuum and any possible leaks.
5) Once the distilled water has been completely removed by the vacuum, start the stopwatch when the first of 100 mls of sample touches the filter paper.
6) Stop the stopwatch when the first part of the filter paper has been cleared of fluid and record the elapsed time. Add 60 ml of distilled water to flush dissolved material from filter.
7) Allow the vacuum to remain running for an additional 15 seconds to clear the filter of fluid.
8) Dry the 0.45 micron filter paper at 135° F. for a minimum of two hours.
9) Accurately weigh and record the final weight of the filter paper.

Using the procedure detailed in Table 3, tests were run in duplicate and the results shown in Table 4 were obtained.

TABLE 4

Raw Data for Filtration Time and Filter Weight.

| Sample | Filter Weight Gain (g) | Average Mass Gain (g) | 100 ml Filtration Time | Time Seconds | Average Time (seconds) | Temp |
|---|---|---|---|---|---|---|
| 1a | 0.0389 | 0.0358 | 6:01:78 | 361.78 | 321.31 | 65.4° F. |
| 1b | 0.0327 | | 4:40:84 | 280.84 | | 65.4° F. |
| 2a | 0.0037 | 0.00395 | 5:30:79 | 330.79 | 325.615 | 65.4° F. |
| 2b | 0.0042 | | 5:20:44 | 320.44 | | 65.4° F. |
| 3a | 0.0020 | 0.00205 | 4:54:94 | 294.94 | 287.505 | 65.7° F. |
| 3b | 0.0021 | | 4:40:07 | 280.07 | | 65.7° F. |
| 4a | 0.0000 | 0.0001 | 00:34:98 | 34.98 | 37.175 | 65.5° F. |
| 4b | 0.0002 | | 00:39:37 | 39.37 | | 65.5° F. |
| 5a | 0.0054 | 0.0062 | 15:15:10 | 915.10 | 889.98 | 65.5° F. |
| 5b | 0.0070 | | 14:24:86 | 864.86 | | 65.5° F. |
| 6a | 0.0015 | 0.0041 | 00:39:82 | 39.82 | 38.65 | 65.6° F. |
| 6b | 0.0067 | | 00:37:48 | 37.48 | | 65.6° F. |
| 7a | 0.0034 | 0.0029 | 05:10:39 | 310.39 | 302.51 | 65.4° F. |
| 7b | 0.0024 | | 04:54:63 | 294.63 | | 65.4° F. |
| 8a | 0.0780 | 0.1024 | >31:53:00 | 1913.00 | 1867 | 65.8° F. |
| 8b | 0.1268 | | >30:21:00 | 1821.00 | | 65.8° F. |

Filtration tests revealed that the base oil (IO-1618) sample (sample 8) had no particles before the test and provided the greatest filter weight increase; however, filtration runs 8a and 8b were stopped after 30 minutes since less than 10 mls of fluid were filtered in this time. The filtration mass was compared with the time required to pass through the filter, and an R-squared value ($R^2$) was calculated as a measure of the accuracy of prediction. In this case, an R-squared value of 0.694 was calculated, meaning there is little/no relationship between the mass accumulated on the filter when compared with the time required for filtering.

Viscosity values reported from the above samples when tested on a Fann E35A VG meter are shown in Table 5 below.

TABLE 5

Raw Reading Data on Samples.

| Sample | 600 rpm | 300 rpm | 200 rpm | 100 rpm | 6 rpm | 3 rpm | Temp |
|---|---|---|---|---|---|---|---|
| 1F | 3 | 1.5 | 1 | 0.5 | 0.5 | 0 | 66.3° F. |
| 2F | 15 | 8 | 5 | 3 | 0.5 | 0 | 68.7° F. |
| 3F | 12.5 | 7 | 4 | 2.5 | 0.5 | 0 | 70.9° F. |
| 4F | 2 | 1 | 1 | 0.5 | 0.5 | 0 | 77.0° F. |
| 5F | 37 | 19 | 13 | 7 | 1 | 0.5 | 70.7° F. |
| 6F | 2.5 | 1.5 | 1 | 0.5 | 0.5 | 0 | 68.5° F. |
| 7F | 15 | 7.5 | 5.5 | 3 | 0.5 | 0 | 70.3° F. |

The most variation with the data appears to be with the 600 rpm reading. Because sample 8 testing was not complete, the filtrate rate mean averages for the remaining 7 data points from Table 4 were compared to the 600 rpm readings. The comparison of this data gives an R-squared values (0.876) and has an almost linear relationship except for sample 1 (filtration time of 321.31 seconds and a 600 RPM reading of 3). Visual examination showed that sample 1 appears to be the only opaque sample and is below the Critical Micelle Concentration (CMC) (insufficient surfactant to emulsify oil into water), whereas sample 2 contains sufficient surfactant which is above the CMC and has a clear appearance. When sample 1 is removed from the comparison, the R-squared value is increased to 0.995, indicating a high correlation of 600 RPM Reading Versus Filtration Time.

Example 2

Five samples were assembled and tested for compatibility with the brine, the sample formulations shown in Table 6 below.

TABLE 6

Five Blend Compositions with Compatibility of Synthetically Contaminated Seawater.

| | Sample Nos. | | | | | |
|---|---|---|---|---|---|---|
| Ingredient | #1 | #2 | #3 | #4 | #5 | #6 |
| EGMBE | 6 ml | 6 ml | 1 ml | 1 ml | 1 ml | 1 ml |
| Bioadd-946 | 2 ml | — | — | 1 ml | — | — |
| Monowet MO-70R | — | 2 ml | 1 ml | — | — | — |
| Tomah Q-17-5 | 2 ml | 2 ml | 3 ml | 3 ml | 3 ml | 3 ml |
| IGEPAL CO-630 | — | — | — | — | 1 ml | — |
| Biosoft N1-7 | — | — | — | — | — | 1 ml |

Each sample was blended and then mixed 50:50 with the Simulated Sea Water shown in Table 1 above. Appearance results are shown in Table 7.

TABLE 7

Blend Compositions Mixed With Simulated Contaminated Sea Water.

| | #1 | #2 | #3 | #4 | #5 | #6 |
|---|---|---|---|---|---|---|
| Clear Sample | No | No | No | No | Yes | Yes |

Only Samples #5 and #6 remained completely clear when mixed with contaminated sea water. Sample #5 contains a nonylphenol ethoxylate, whereas #6 contains an alcohol ethoxylate.

The samples were then subjected to the filtration test described above, and their turbidity was also determined. The results are shown in Table 8 below.

TABLE 8

Filtration Time Required for 500 ml of Sample to Pass Through Filter.

| Ingredient | NTU | 500 ml Filtration Time |
|---|---|---|
| NTU Standard (20) | 22.2 | — |
| Contaminated Sea Water | Off-Scale | 11:33:98 |
| Sample #5 (emulsifier) | 13.3 | 110:43:33 |
| Emulsified Contaminated Sea Water | 9.95 | 142:53:92 |
| Particles in Emulsified Contaminated Sea Water[1] | Off-scale | 160:21:00 (125 ml) |

[1]Particles added were: 4.05 g Safecarb 250, 4.10 g Barite and 2.00 g of Rev Dust in 500 ml. Only 125 ml of sample passed through the filter.

The 20 NTU standard has a reading of 22.2 which is in the tolerable limits for this test. Contaminated Sea Water is completely opaque and the reading is off-scale, in which no light is able to pass through the sample. The emulsifier has a reading of 13.3 translating to an almost clear sample. When mixing the Contaminated Sea Water with the Emulsifier to create the Emulsified Contaminated Sea Water sample, the NTU value changes from Off-scale to 9.95. Adding particles to the Emulsified Contaminated Sea Water causes the NTU reading to be Off-scale in which no light is able to penetrate the sample.

Advantageously, embodiments of the present disclosure for at least one of the following. By treating wellbore fluids with an emulsifier package, a stabilized emulsion may be achieved that removes opacity. This treatment may also remove an interference with total suspended solids as well. By forming a complete emulsion, the interference associated with partial emulsions may be removed, and the tests may more accurately reflect the properties of a returned wellbore fluid, which may in turn more accurately reflect whether a wellbore and/or equipment has been sufficiently cleaned. This may reduce the overall costs associated with cleaning operations due to an earlier determination of when the wellbore fluid meets threshold requirements.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of analyzing a wellbore fluid, comprising:
   collecting a partially emulsified wellbore find;

treating the partially emulsified wellbore fluid with an emulsifying fluid to form a complete emulsion, the emulsifying fluid comprising:
a hydroxylated ether;
an emulsifying agent; and
testing the treated wellbore fluid for at least one of turbidity and total suspended solids.

2. The method of claim 1, wherein the emulsifying fluid further comprises:
a mutual solvent.

3. The method of claim 1, wherein hydroxylated ether comprises at least one of an alkanol ethoxylate and an alkylphenol ethoxylate.

4. The method of claim 1, wherein the treated wellbore fluid has a reduced turbidity as compared to an untreated wellbore fluid.

5. The method of claim 1, wherein the treated wellbore fluid has a reduced total suspended solids as compared to an untreated wellbore fluid.

6. The method of claim 1, wherein the emulsifying agent is an amphoteric chemotrope selected from one or more of ammonium compounds of the formulae:

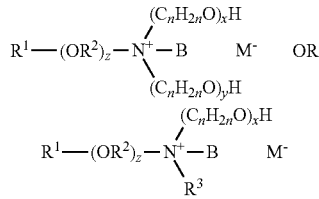

where $R^1$ may be an alkyl or alkenyl group having at least 8 carbons, or an ester derived from a fatty acid; $R^2$ may be an alkyl group having 2-6 carbon atoms; $R^3$ may be an alkyl group having at least 4 carbons; n may be either 2 or 3; x+y is 5 to 20; z ranges from 0 to 3; B is hydrogen, an oxyalkyl or alkyl having 1 to 4 carbons, and M is one or more selected from a group consisting of a halide, a nitrate, a sulfate, an acetate, an alkyl sulfonate ion, and a haloalkylsulfonate.

7. The method of claim 1, wherein the emulsifying anget is an amphoteric chemotrope comprises a quaternary ammonium halide.

8. A method of cleaning a wellbore, comprising:
circulating a wellbore fluid through a wellbore;
collecting the circulated wellbore fluid from the wellbore;
treating the collected wellbore fluid with an emulsifying fluid, the emulsifying fluid comprising:
a hydroxylated ether;
an amphoteric chemotrope; and
testing the treated wellbore fluid for at least one of turbidity and total suspended solids.

9. The method of claim 8, further comprising:
continuing circulation of the wellbore fluid through the wellbore.

10. The method of claim 8, further comprising:
initiating production of hydrocarbons through the wellbore.

11. The method of claim 8, wherein the wellbore fluid comprises a partial emulsion.

12. The method of claim 8, wherein the emulsifying fluid further comprises a mutual solvent.

13. The method of claim 8, wherein the hydroxylated ether comprises at least one of an alkanol ethoxylate and an alkylphenol ethoxylate.

14. The method of claim 8, wherein the treated wellbore fluid has a reduced turbidity as compared to an untreated wellbore fluid.

15. The method of claim 8, wherein the treated wellbore fluid has a reduced total suspended solids as compared to an untreated wellbore fluid.

16. The method of claim 8, wherein the amphoteric chemotrope is selected from one or more of ammonium compounds of the formulae:

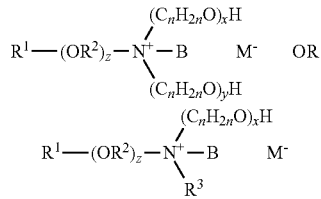

where $R^1$ may be an alkyl or alkenyl group having at least 8 carbons, or an ester derived from a fatty acid; $R^2$ may be an alkyl group having 2-6 carbon atoms; $R^3$ may be an alkyl group having at least 4 carbons; n may be either 2 or 3; x+y is 5 to 20; z ranges from 0 to 3; B is hydrogen, an oxyalkyl or alkyl having 1 to 4 carbons, and M is one or more selected from a group consisting of a halide, a nitrate, a sulfate, an acetate, an alkyl sulfonate ion, and a haloalkylsulfonate.

17. The method of claim 8, wherein the amphoteric chemotrope comprises a quaternary ammonium halide.

* * * * *